(12) United States Patent
Dazet

(10) Patent No.: US 9,174,721 B2
(45) Date of Patent: Nov. 3, 2015

(54) AIRCRAFT WINDSHIELD ASSEMBLY

(71) Applicant: Airbus Operations S.A.S., Toulouse (FR)

(72) Inventor: Francis Dazet, Tournous Darre (FR)

(73) Assignee: Airbus Operations S.A.S. (FR)

( * ) Notice: Subject to any disclaimer, the term of this patent is extended or adjusted under 35 U.S.C. 154(b) by 42 days.

(21) Appl. No.: 14/096,131

(22) Filed: Dec. 4, 2013

(65) Prior Publication Data

US 2014/0166809 A1   Jun. 19, 2014

(30) Foreign Application Priority Data

Dec. 4, 2012 (FR) ...................................... 12 61591

(51) Int. Cl.
*B64C 1/14* (2006.01)
(52) U.S. Cl.
CPC ..................................... *B64C 1/1492* (2013.01)
(58) Field of Classification Search
CPC ..................................... B64C 1/00; B64C 1/14
USPC ....................... 244/129.4, 129.3; 49/215, 213
See application file for complete search history.

(56) References Cited

U.S. PATENT DOCUMENTS

| 2,575,854 | A | * | 11/1951 | Verhagen | ...................... | 52/127.8 |
| 4,004,388 | A | * | 1/1977 | Stefanik | ................... | 52/204.593 |
| 6,818,281 | B2 | * | 11/2004 | Blevins et al. | ................. | 428/194 |
| 7,552,896 | B2 | * | 6/2009 | Coak | .......................... | 244/129.3 |
| 2003/0062450 | A1 | | 4/2003 | Dazet et al. | | |
| 2007/0194177 | A1 | | 8/2007 | Coak | | |
| 2010/0020381 | A1 | | 1/2010 | Legois et al. | | |

FOREIGN PATENT DOCUMENTS

| EP | 1 300 333 A1 | 4/2003 |
| FR | 2 909 921 A1 | 6/2008 |

* cited by examiner

*Primary Examiner* — Justin Benedik
(74) *Attorney, Agent, or Firm* — Lerner, David, Littenberg, Krumholz & Mentlik, LLP

(57) ABSTRACT

An aircraft windshield assembly includes at least one window pane, a frame against which the pane bears, at least one flange for clamping the pane against the frame, and at least one cavity delimited between the pane, the frame and the flange. A member of profiled cross-section substantially fills the cavity and over at least part of its periphery has formations in relief in the form of flutes which with a facing surface define seal-forming baffles.

16 Claims, 4 Drawing Sheets

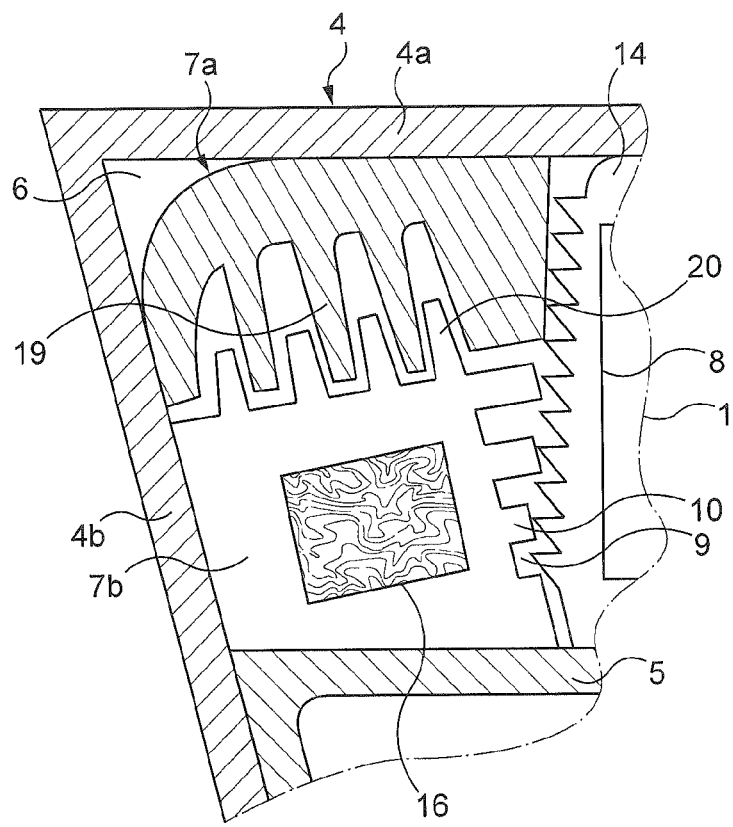
Fig. 10
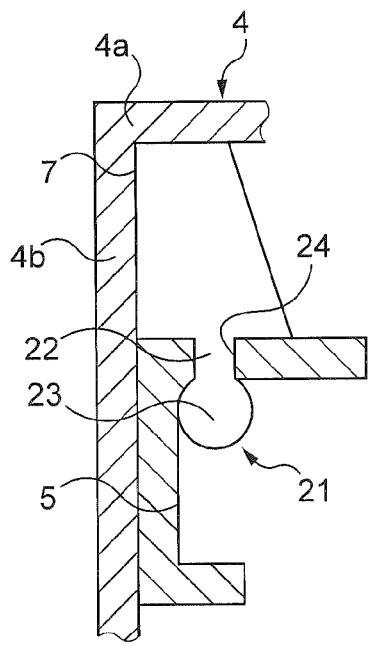 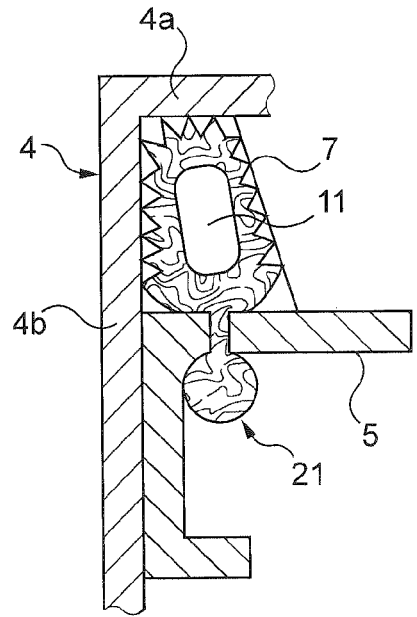
Fig. 11  Fig. 12

AIRCRAFT WINDSHIELD ASSEMBLY

FIELD OF THE INVENTION

The invention concerns aircraft cockpit windshield assemblies as well as the aircraft equipped with such windshield assemblies.

BACKGROUND OF THE INVENTION

Aircrafts are generally provided with cockpit windshield assemblies of which the window panes or transparent members are flat, which gives the windshield assembly a convex shape with multiple flat facets which are joined with the front part of the fuselage. This technical solution enables transparent members of limited cost to be used for the window panes and simple window pane frames. However, this type of windshield assembly locally gives rise to a high aerodynamic drag.

To reduce the aerodynamic drag of the aircraft in the region of the windshield assembly, it is known to use window panes for that assembly which have dual curvature. This horizontally and laterally curved shape of the window panes joins perfectly with the shape of the fuselage and enables significant reductions in aerodynamic drag.

Numerous aircraft windshield assemblies possess six window panes (two in a front position, two in a side position and two in a rear position, relative to the pilots) of which the two front window panes are mounted and fastened with flanges from outside the aircraft. This is because the presence of the navigation screens of the cockpit does not enable mounting of the front window panes from inside the aircraft.

This embodiment for mounting the front window panes enables fast replacement of the window panes, without constraint on the utilization of the machine. The recourse to mechanical ways of mounting the window panes with sealant-free joints makes it possible to avoid the use of sealing mastics of which the curing may exceed 24 hours and which lead to relatively complex demounting and cleaning of the structures.

For the other four window panes, (lateral and rear), when not prevented by any item of equipment inside the cockpit, the mounting is preferably carried out from inside the cockpit since the pressure which is ambient inside the cabin in cruising conditions promotes the sealing and the safety of this part of the windshield assembly. This solution for mounting the window panes from inside the cockpit is also advantageous for minimizing the mass of the elements for joining the window panes with the structure of the windshield assembly.

However, the mounting of literal and rear window panes with dual curvature from inside the cockpit generates a large cavity between the structure and the transparent member.

In case of bird strikes on the windshield assembly of the cockpit, the birds are transformed into liquid and gas which the cavity or cavities become charged with. The deformations of the window panes and of the framing structure which result therefrom may have a damaging effect on the windshield assembly.

Numerous civil and military aircraft, of small size, which generally have no cabin pressurization, have windshield assemblies with a dual curvature, but the technical solutions for connecting the transparent members with the structure do not have cavities liable to weaken those zones when bird strikes occur.

BRIEF SUMMARY OF THE INVENTION

An aspect of the invention provides a windshield assembly of the aforementioned type that enables its damage in case of bird strike to be avoided and to maintain as short a mounting and demounting time for the window panes as possible.

An embodiment of the invention includes an aircraft windshield assembly comprising at least one window pane, a frame against which said window pane bears, at least one flange for clamping said window pane against said frame, and at least one cavity delimited between said window pane, said frame and said flange, said windshield assembly comprising at least one member of profiled cross-section adapted to substantially fill said cavity and having, over at least part of its periphery, formations in relief which with a facing surface define seal-forming baffles.

In case of a bird strike in the connection zone between the frame and the window pane of the windshield assembly, mechanical deformation of the parts of that zone takes place. The pressure of the gases and the liquid coming from the bird is abruptly applied in that connection zone and, from there, to the baffles formed between the formations in relief of the member of profiled cross-section and the facing surface. The baffles comprise baffle cavities separated from each other by zones in which the formations in relief are in contact with or at a short distance from the facing surface such that the pressure drops greatly on each passage from one baffle cavity to the next baffle cavity and minimizes the passage of gaseous and liquid residues from the birds. By limiting the passage of the aforesaid gaseous and liquid residues, these baffles form a seal which will be designated "baffle seal" below. This expression "baffle seal" must be given the meaning that comes from the present description.

If the window pane has to be replaced, the demounting thereof and the mounting of a new window pane may be achieved in a few hours whereas more than twenty-four would be necessary if the cavity were filled with a seal of curable elastomer.

According to an aspect of the invention, said formations in relief comprise longitudinal flutes. This type of formation in relief constituting a baffle seal may easily be produced by machining or molding of the member of profiled cross-section.

According to another aspect of the invention, at least some of said flutes have at least one edge with a sharp rib. Flutes with sharp ribs prove particularly effective to make the pressure drop greatly and to minimize the passage of gaseous and liquid residues from the birds. The provision of a multiplicity of sharp ribs makes it possible, at each baffle cavity, to repeat successively the effect of a large reduction in the pressure of the gas and the liquid resulting from a strike.

According to another aspect of the invention, said member of profiled cross-section is of a substantially rigid material. The member of profiled cross-section is thus capable of withstanding the high pressures to which it is subjected in case of bird strikes in the connection zone between the frame and the window pane of the windshield assembly.

According to yet another aspect of the invention, said member of profiled cross-section is metallic. It may for example be produced from an aluminum alloy that is a material that is easy to machine and light.

According to another aspect of the invention, said member of profiled cross-section is of synthetic material, for example Teflon, nylon or resin with a short-fiber filler, or the like. These materials have the advantage of being relatively light, but the selected material must have good mechanical strength properties in compression, due to the high pressure, resulting from the liquefaction and the gasification of the bird, when a strike occurs.

According to another aspect of the invention, said member of profiled cross-section comprises a central core of a material more flexible than its periphery. The member of profiled cross-section, which is preferably of elastomer material, thus provides a shock-absorbing function in addition to the pressure reduction function provided by the baffles.

According to another aspect of the invention, said member of profiled cross-section is fastened to said flange, for example by bonding or snap-engagement, which facilitates the mounting and demounting operations. In this case, each of the members of profiled cross-section must correspond to the length and the geometry of each of the flanges.

According to yet another aspect of the invention, said member of profiled cross-section comprises a first part of profiled cross-section and a second part of profiled cross-section, said parts of profiled cross-section comprising meshing teeth formations forming said baffles between them. This arrangement enables the teeth formations to be given the desired shapes and dimensions to optimize the effect of reducing the pressure in case of abrupt application of a very high pressure in the connection zone between the frame and the window pane of the windshield assembly According to another aspect of the invention, the first part of profiled cross-section is fastened to said frame and said second part of profiled cross-section is fastened to said flange, which makes it possible to provide proper fastening of each of the two parts.

According to another aspect of the invention, said member of profiled cross-section for filling said cavity extends over the whole periphery of the window pane, which enables the entirety of the cavity surrounding the window pane to be filled.

According to another aspect of the invention, said member of profiled cross-section is a single annular part, which facilitates mounting and demounting.

According to yet another aspect of the invention, said member of profiled cross-section is integrally formed with said flange. The member of profiled cross-section may thus be machined as an integral part of the flange, which may for example be of aluminum alloy. Complete connection between the member of profiled cross-section and the flange is thus provided with a limited cost and very high reliability.

According to another aspect of the invention, said formations in relief comprise at least one transverse flute formed in at least one of the faces of said member of profiled cross-section.

The invention also relates to an aircraft comprising at least one windshield assembly as defined above.

BRIEF DESCRIPTION OF THE DRAWINGS

Other features and advantages of the invention will become apparent from the following description of embodiments given by way of example and illustrated by the appended drawings in which:

FIG. 10 is a similar view to FIG. 6 illustrating a fourth embodiment of the invention;

FIG. 11 illustrates a first embodiment for fastening a member of profiled cross-section onto a flange; and FIG. 12 illustrates a second embodiment for fastening a member of profiled cross-section onto a flange.

DETAILED DESCRIPTION

Figure 1:
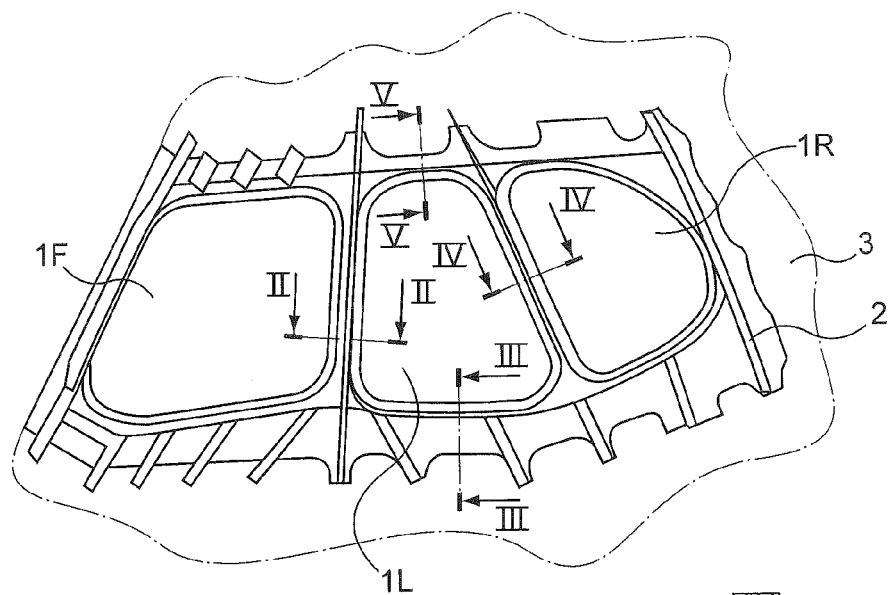
FIG. 1 is a partial view in side elevation, with cutting away, of a part of an aircraft cockpit windshield assembly seen from inside the cockpit.
Figure 2:
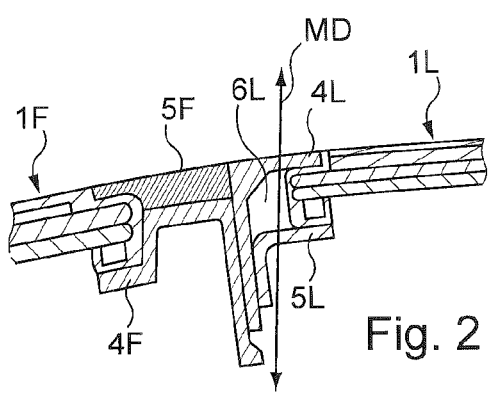
FIG. 2 is a cross-section view on line 2-2 of FIG. 1.
Figure 3:
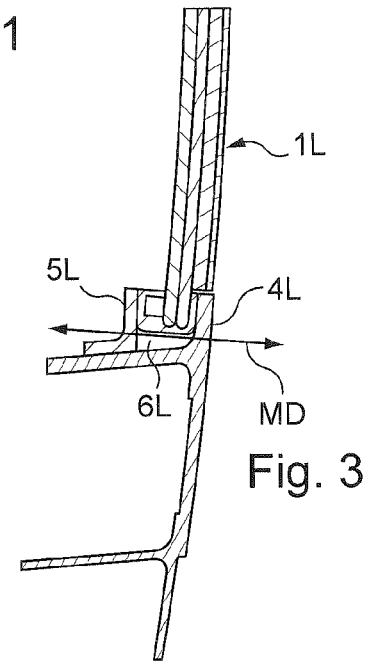
FIG. 3 is a cross-section view on line 3-3 of FIG. 1.
Figure 4:
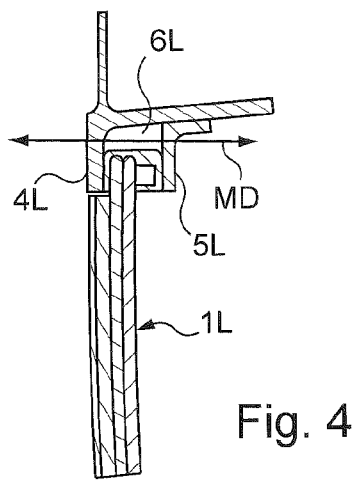
FIG. 4 is a cross-section view on line 4-4 of FIG. 1.
Figure 5:
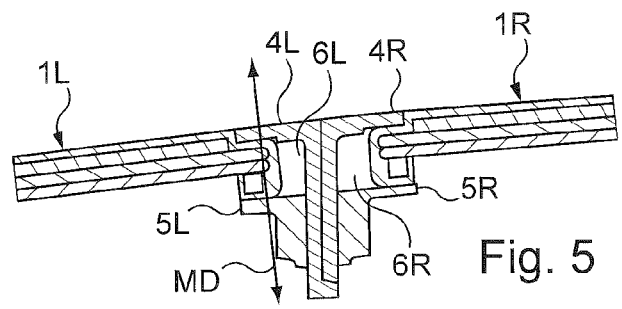
FIG. 5 is a cross-section view on line 5-5 of FIG. 1.

FIG. 1 represents half an aircraft cockpit windshield assembly comprising a front window pane 1F, a lateral window pane 1L and a rear window pane 1R. The other half (not shown) of the windshield assembly is symmetrical with that represented relative to a longitudinal plane of symmetry of the aircraft.

Window panes 1F, 1L and 1R are mounted in a frame designated as a whole by reference 2 which is carried by and joined to a structure 3 of the front part of the fuselage of the aircraft.

The front window pane 1F is planar and is mounted in the frame 2 from the outside of the cockpit. It is held in place against its frame 4F by means of flanges 5F fastened to the frame 4 by means not shown in the drawing.

The lateral 1L and rear 1R window panes are of the dual curvature type, that is to say that they are curved laterally and horizontally to connect with the shape of the aircraft fuselage (not shown) while limiting the aerodynamic drag.

The mounting on the frame 2 of the lateral 1L and rear 1R window panes and their demounting from that frame is carried out from inside the cockpit (not shown), in the direction of the arrows represented in FIGS. 2 to 5.

The lateral window pane 1L is held bearing against its frame 4L by flanges 5L represented in FIGS. 2 to 5. The flanges 5L are fastened to the frame 4L by conventional means (not shown) that are well-known to the person skilled in the art.

Due to the dual curvature of the lateral window pane 1L and due to its mounting/demounting from the inside of the cockpit, in the directions indicated by the arrows MD in FIGS. 2 to 5, a cavity 6L gets formed between the peripheral edge of the window pane 1L (or more precisely the seal which surrounds that window pane), the frame 4L and the flanges 5L. This cavity 6L extends entirely around the lateral window pane 1L.

Similarly, the rear window pane 1R with dual curvature and mounting/demounting from the inside of the cockpit leads to the existence of a cavity 6R between the peripheral edge of the window pane 1R (or more precisely the seal which surrounds that window pane), its frame 4R and its holding flange 5R. This cavity 6R extends over the whole periphery of the rear window pane 1R.

In order to avoid the windshield assembly being damaged subsequent to a bird strike in the connection zone of the window panes 1L and 1R with their respective frame 4L and 4R, the cavities 6L and 6R are equipped with baffle seals. These have not been represented in FIGS. 2 to 5 for clarity of the drawing, but they will now be described with reference to FIGS. 6 to 12.

Figure 6:
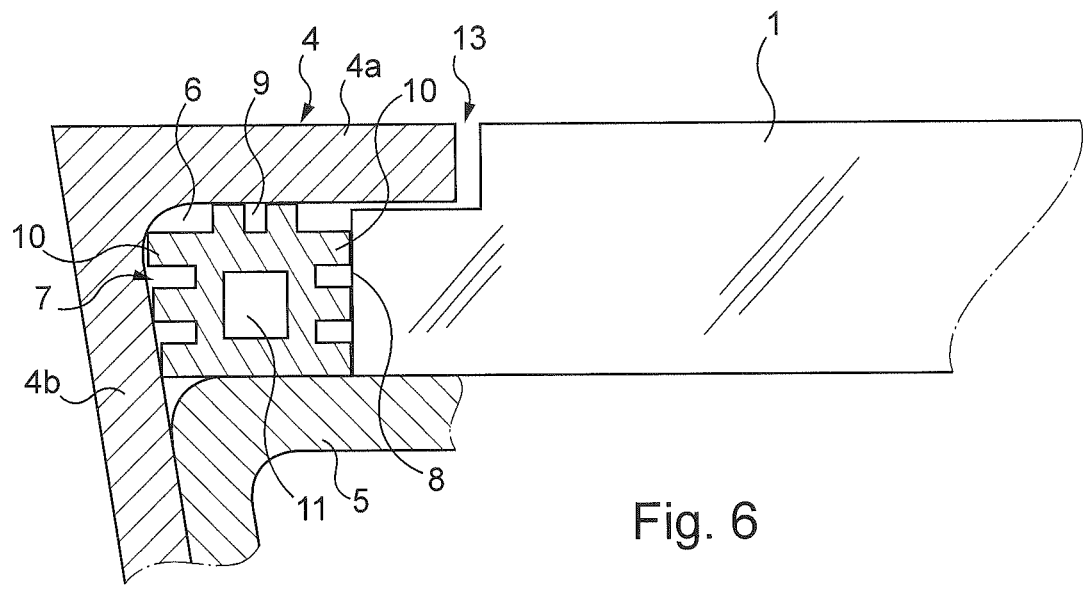
FIG. 6 is a detail view in cross-section and at larger scale illustrating a member of profiled cross-section according to a first embodiment of the invention.
Figure 7:
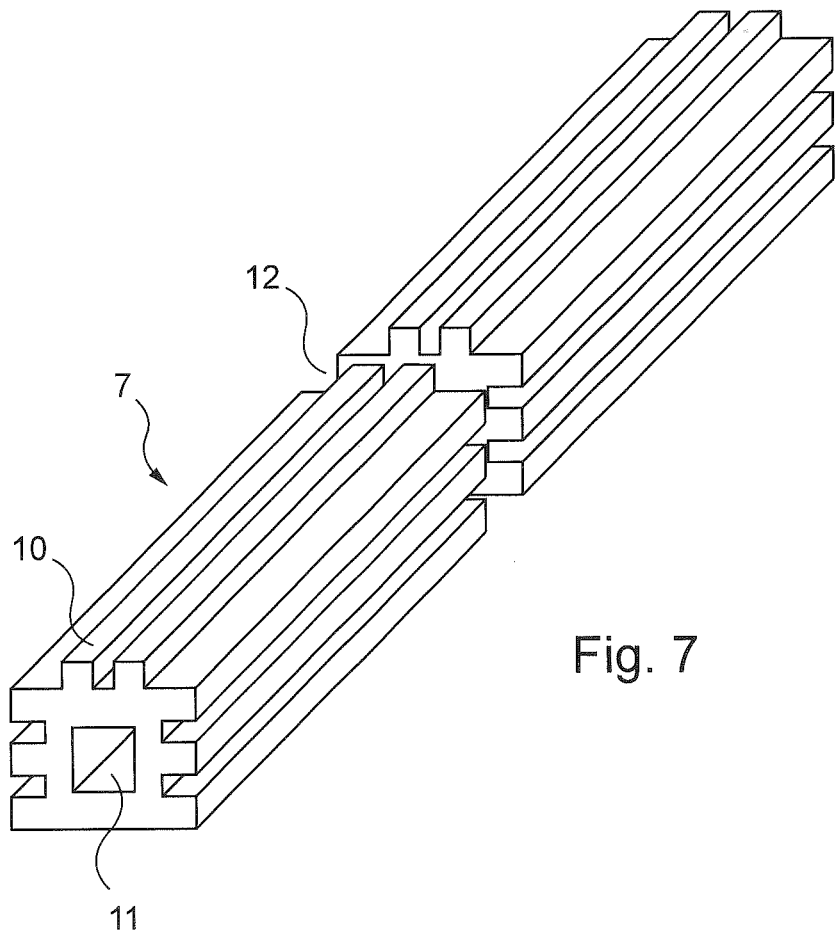
FIG. 7 is a perspective view illustrating the member of profiled cross-section of FIG. 6.

Referring to FIGS. 6 and 7, a baffle seal according to a first embodiment of the invention comprises a member of profiled cross-section 7 disposed in the cavity 6 formed between the peripheral edge 8 of the window pane 1 (or more precisely the seal which is not shown in FIG. 6 which surrounds that window pane), the frame 4 of the windshield assembly and the flange 5 which, from inside the windshield assembly, keeps the window pane 1 bearing against the frame 4.

Preferably, the member of profiled cross-section 7 fills the entirety of the cavity 6, not only by its cross-section but also in the longitudinal direction. If the tubular cavity 6 extends over the entire periphery of the window pane 1, the same preferably applies for the member of profiled cross-section 7.

The member of profiled cross-section 7 has flutes over at least part of its periphery which are constituted by longitudinal grooves 9 which alternate with longitudinal projecting ribs 10, forming a profiles with baffles. In the example embodiment of FIGS. 6 and 7, the member of profiled cross-section 7 is of substantially quadrilateral shaped cross-section. A first side of the quadrilateral is turned towards the substantially planar peripheral edge 8 of the window pane 1 (or more exactly towards the seal not shown in FIG. 6 that surrounds that window pane), and has a profile with baffles. The second side of the quadrilateral which also has a profile with baffles is turned towards the substantially planar inside face of a wall 4a of the frame 4 which extends substantially in line with the window pane 1. A third side of the quadrilateral is oriented towards a substantially planar face of the web 4b of the frame 4 which extends, transversely relative to the wall 4a and to the window pane 1, towards the inside of the cockpit. This third side is also provided with grooves 9 and ribs 10 forming baffles. Lastly, a fourth side of the quadrilateral is planar and is fastened to a facing face of the flange 5 by bonding, snap engagement, etc. or the like as will be described below.

In the embodiment illustrated in FIGS. 6 and 7, the member of profiled cross-section 7 is hollow and has an internal cavity 11, which enables a weight saving. This member of profiled cross-section is of rigid material, for example a metal such as an aluminum alloy. The member of profiled cross-section 7 is dimensioned such that the apexes of the ribs 10 just touch or are at a very small distance from the facing walls of the window pane 1 of the frame 4. The flanges 5, which are fastened to the frame 4 by means not shown, hold the window pane 1 and the member of profiled cross-section 7 bearing against the wall 4a of the frame.

The member of profiled cross-section 7 may be formed in one or more segments. If the cavity 6 extends entirely around the window pane 1, it may be a single part of generally annular form if its mode of manufacture so enables.

In addition to the longitudinal baffles formed by the grooves 9 and the ribs 10, the member of profiled cross-section 7 may comprise transverse baffles 12 here and there along its length which are formed in one or more of its faces as represented in FIG. 7. These transverse baffles 12 may for example be constituted by grooves.

The window pane 1 is put into place against the wall 4a of the frame 4 from the inside of the cockpit which is situated on the same side as the flange 5. The air-tightness between the window pane 1 and the frame 4 is provided by seals and other conventional mechanical means known to the person skilled in the art and which it is not necessary to describe in detail in the present application. The mounting of the window pane 1 from the inside of the cockpit means that, when the aircraft is cruising and its cabin is pressurized, the difference between the ambient pressure inside the cockpit and that ambient outside the aircraft contributes mechanically to pressing the window pane 1 against the frame 4 and promotes the sealing of that part of the windshield assembly.

However, in case of bird strike in the connection zone 13 between the window pane 1 and its frame 4, a deformation of the various mechanical parts of that zone occurs and gases and liquid at very high pressure are abruptly applied in the direction of the cavity 6.

If there is such an occurrence, the longitudinal baffles 9, 10 and transverse baffles 12 of the member of profiled cross-section contribute to making the pressure of the gas and the liquid drop greatly at each passage of a baffle. This pressure reduction phenomenon is repeated each time a baffle is crossed, such that after the passage of several baffles the pressure of the gas and the liquid is rapidly lowered to a value compatible with good mechanical integrity of the components of the windshield assembly.

Figure 8:
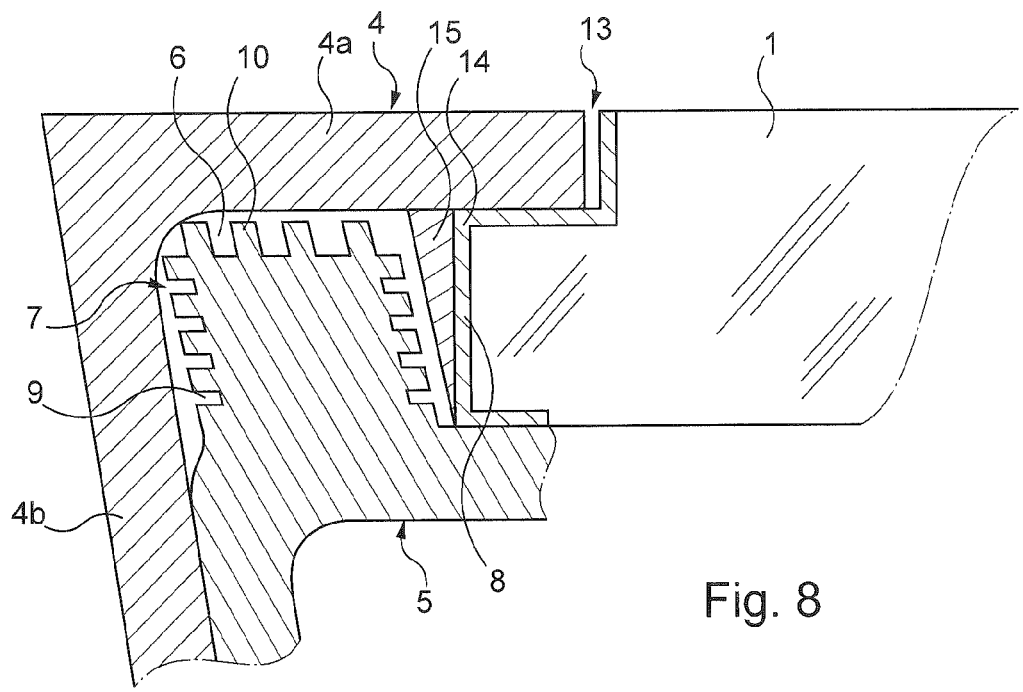
FIG. 8 is a similar view to FIG. 6 illustrating a second embodiment of the invention.

FIG. 8 illustrates a second embodiment of the invention in which the member of profiled cross-section 7 is solid and integrally formed with the flange 5. The flange 5 and the member of profiled cross-section 7 are preferably of metal, for example of aluminum alloy, and may thus be machined together. The manufacturing and the mounting of the parts for assembly of the window pane 1 against its frame 4 are thereby simplified.

The member of profiled cross-section 7 of FIG. 8 has a substantially parallelepiped shape in cross-section: the face of the member of profiled cross-section 7 that is turned towards the peripheral edge 8 of the window pane 1 is substantially parallel to its face that is turned towards the wall or web 4b of the frame.

The window pane 1 illustrated in FIG. 8 comprises on its peripheral edge 8 a conventional peripheral seal 14, which was not represented in FIG. 6 for the sake of clarity of the drawing. The seal 14, which is for example of silicone, is of substantially a U-shaped cross-section complementary with the cross-section of the peripheral edge of the window pane 1. These U-shapes of the peripheral seal 14 and of the edge 8 enables the window pane 1 to be encased between the wall 4a of the frame 4 and the flange 5. Furthermore, according to the example of FIG. 8, the seal 14 comprises a foam member 15 on its apex face facing the member of profiled cross-section 7. This foam member 15 is of wedge-shaped cross-section so as to present an outside face parallel to the web 4b of the frame 4 and to the facing face of the member of profiled cross-section 7. The wedge-shaped foam member 15 fills up the space between the apex face of the seal 14, which is substantially perpendicular to the wall 4a of the frame, and the adjacent face of the member of profiled cross-section 5 which is oblique relative to that wall 4a. The foam member 15 enables the machining and/or the manufacturing of the various parts to be facilitated since the member of profiled cross-section 7 has lateral faces which are parallel to each other and to a lateral face of the flange 5 and the peripheral edge of the window pane 4 remains substantially perpendicular to the general plane of thereof.

In case of bird strike in the connection zone 13 between the frame 4 and the window pane 1, the member of profiled cross-section 7 of FIG. 8 gives the effect of a baffle seal described with reference to the example of FIG. 7.

Figure 9:
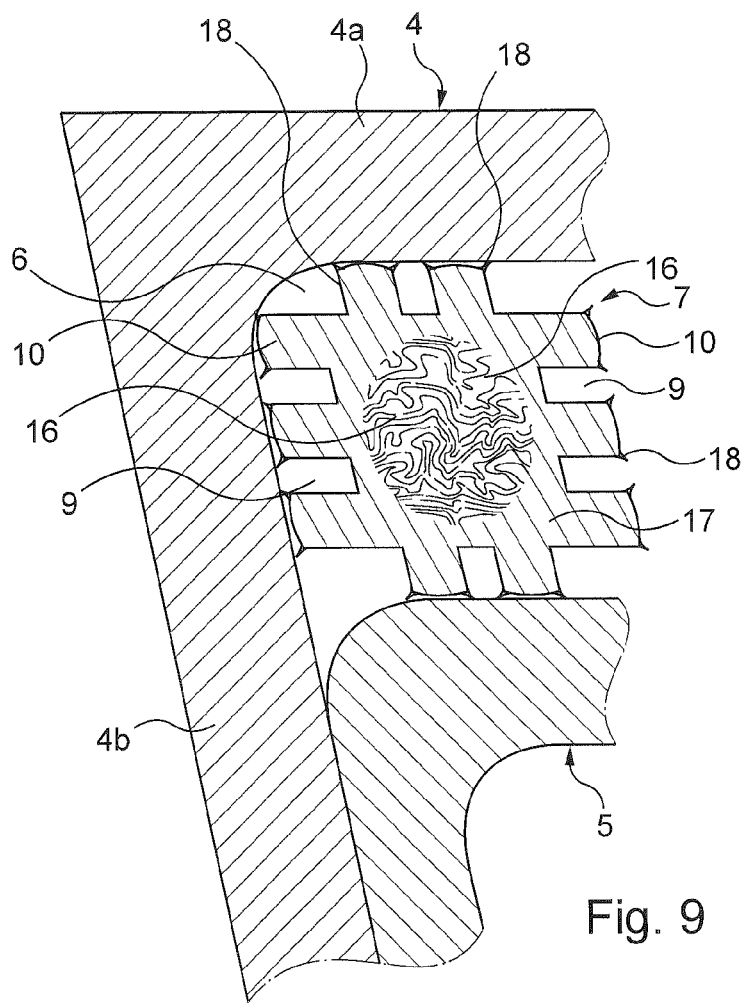
FIG. 9 is a similar view to FIG. 6 illustrating a third embodiment of the invention.

FIG. 9 illustrates a third embodiment of the member of profiled cross-section 7 in which that member is of similar overall shape to the member of profiled cross-section of FIG. 6. In this third example, the member of profiled cross-section 7 is formed, for example, by molding a synthetic material (for example Teflon, nylon, resins with a short fiber filler, etc. or the like) or else by molding or machining of a metal material (aluminum alloy for example).

Furthermore, the member of profiled cross-section 7 of FIG. 9 comprises a core 16 of a material of lower density than that from which is constituted the peripheral part 17 of synthetic or metal material of the member of profiled cross-section 7.

Thanks to its core 16 of lower density than its periphery 17, the member of profiled cross-section 7 also satisfies a function of shock absorbing in case of bird strike on the windshield assembly in the conditions described above.

As FIG. 9, shows, the ribs 10 may on their apex portion have one or more sharp or pointed edges forming lips 18. These lips 18 enabled the labyrinth effect of the baffle seal to be accentuated and to increase the progressiveness of the pressure drop in case of bird strike.

In this example of FIG. 9, baffles are provided over the entirety of the periphery of the member of profiled cross-section 7. The grooves 9 and the ribs 10 which form the baffles do not necessarily have a rectangular or square cross-section, it being possible for that cross-section to be curvilinear as shows FIG. 9.

In the fourth embodiment illustrated in FIG. 10, the baffle seal filling the cavity 6 comprises two complementary members of profiled cross-section 7a and 7b.

One of the members of profiled cross-section 7a comprises a series of teeth 19 on one of its faces turned towards the flange 5. The member of profiled cross-section 7a is fastened, for example by bonding, to the walls 4a and 4b of the frame 4. The fourth face of the member of profiled cross-section is turned towards a face which is on the seal 14 disposed at the periphery of the window pane 1 and which is serrated by provision of a foam member.

The second member of profiled cross-section 7b comprises a series of teeth 20 of the same pitch as the teeth 19, the teeth 20 being meshed with the teeth 19. The teeth 19 and 20 have different heights such that a space is formed between the apex of one tooth 20 and the teeth formation trough separating two teeth 19.

The second member of profiled cross-section 7b is fastened to the flange 5, for example by bonding, by its opposite face to that bearing the teeth 20. The face of the member of profiled cross-section 7b turned towards the seal 14 has flutes which, as in the example of FIG. 6, are constituted by grooves 9 and ribs 10. This fluted face of the member of profiled cross-section 7b is adjacent to a facing face of the seal 14 that is serrated in the form of a comb, forming therewith a baffle seal. The member of profiled cross-section 7b bears against the web of the frame 4b by a fourth face which is for example planar. The member of profiled cross-section 7b comprises a web 16 of a material of lower density than its peripheral part to ensure a shock-absorbing function.

In case of a bird strike in the conditions which were described above, the zones included between the member of profiled cross-section 7a and the serrated adjacent face of the seal 14, between the fluted face of the member of profiled cross-section 7b and the adjacent serrated face of the seal 14, and between the meshed teeth 19 and 20 play the role of baffle seals. In case of impact these baffle seal forming zones procure the pressure reducing effect described above.

FIG. 11 illustrates an embodiment for fastening the member of profiled cross-section 7 onto the flange 5 which is particularly adapted to a member of profiled cross-section 7 of an elastomer material. In this example, the member of profiled cross-section 7 is provided on one of its faces with one or more pins or spurs 21 having a stem 22 and a widened head 23. The flange 5 comprises the same number of bores 24 as there are pins 21. The bore 24 is of a diameter corresponding to that of the stem 22 but less than that of the head 23. The length of the stem 22 substantially corresponds to that of the thickness of the flange 5. When the head 23 is forcibly pushed into the bore 24 and emerges therefrom, the pin 21 is immobilized in the flange 5. The fastening of the member of profiled cross-section 7 may be completed by bonding onto the flange 5. As a variant, the pin 21 may be serrated in known manner to ensure it is retained in the bore 24.

FIG. 12 illustrates a variant embodiment of the example of FIG. 11 whereby the member of profiled cross-section 7 is also fastened to the flange 5 by one or more pins 21. The member of profiled cross-section 7 of FIG. 12 comprises an inside cavity 11 to provide damping in case of shock, as well as saw-tooth-shaped striations on both its faces that face the walls 4a and 4b of the frame 4 and on its face facing the peripheral edge of the window pane 1 (not shown). The striated surfaces of the member of profiled cross-section 7 form baffle seals with the facing surfaces and thereby procure the sought-after effect of pressure reduction in case of bird strike. The embodiment of FIG. 12 is particularly adapted to equipping zones that are very confined.

The invention claimed is:

1. An aircraft windshield assembly comprising:
   at least one window pane;
   a frame against which said window pane bears;
   at least one flange for clamping said window pane against said frame;
   at least one cavity delimited between said window pane, said frame and said flange; and
   at least one member of profiled cross-section adapted to substantially fill said cavity and having, over at least part of a periphery thereof, a plurality of formations in relief which with a facing surface define seal-forming baffles.

2. The aircraft windshield assembly according to claim 1, wherein said formations in relief comprise longitudinal flutes.

3. The aircraft windshield assembly according to claim 2, wherein at least some of said flutes have at least one edge with a sharp rib.

4. The aircraft windshield assembly according to claim 1, wherein member of profiled cross-section is of a substantially rigid material.

5. The aircraft windshield assembly according to claim 4, wherein said member of profiled cross-section is of metal.

6. The aircraft windshield assembly according to claim 4, wherein said member of profiled cross-section is of synthetic material.

7. The aircraft windshield assembly according to claim 6, wherein said member of profiled cross-section comprises a central core of a material more flexible than its periphery.

8. The aircraft windshield assembly according to claim 1, wherein said member of profiled cross-section is fastened to said flange.

9. The aircraft windshield assembly according to claim 1, wherein said member of profiled cross-section comprises a first part of profiled cross-section and a second part of profiled cross-section, said parts of profiled cross-section comprising meshing teeth formations forming said baffles between them.

10. The aircraft windshield assembly according to claim 9, wherein said first part of profiled cross-section is fastened to said frame and said second part of profiled cross-section is fastened to said flange.

11. The aircraft windshield assembly according to claim 1, wherein said member of profiled cross-section extends over the entire periphery of the window pane.

12. The aircraft windshield assembly according to claim 11, wherein said member of profiled cross-section is a single annular part.

13. The aircraft windshield assembly according to claim 5, wherein said member of profiled cross-section is integrally formed with said flange.

14. The aircraft windshield assembly according to claim 1, wherein said formations in relief comprise at least one transverse flute formed in at least one of the faces of said member of profiled cross-section.

15. The aircraft windshield assembly according to claim 1, wherein said window pane comprises a peripheral seal and wherein said cavity is delimited between said seal, said frame and said flange.

16. An aircraft, comprising at least one windshield assembly comprising:
- at least one window pane;
- a frame against which said window pane bears;
- at least one flange for clamping said window pane against said frame;
- at least one cavity delimited between said window pane, said frame and said flange; and
- at least one member of profiled cross-section adapted to substantially fill said cavity and having, over at least part of a periphery thereof, a plurality of formations in relief which with a facing surface define seal-forming baffles.

\* \* \* \* \*